United States Patent [19]
Wall

[11] Patent Number: 5,642,797
[45] Date of Patent: Jul. 1, 1997

[54] MOLDED PLASTIC ROTOR ASSEMBLY FOR ELECTROMAGNETIC FRICTION CLUTCH

[75] Inventor: John H. Wall, Kennesaw, Ga.

[73] Assignee: Dana Corporation, Toledo, Ohio

[21] Appl. No.: 597,433

[22] Filed: Feb. 8, 1996

[51] Int. Cl.$^6$ ............................................. F16D 27/112
[52] U.S. Cl. ............................................. 192/84.961
[58] Field of Search .................... 192/84.961, 84.951, 192/84.1, 84.96; 264/271.1, 272.2, 272.19; 335/296

[56] References Cited

U.S. PATENT DOCUMENTS

| | | | |
|---|---|---|---|
| 3,044,594 | 7/1962 | Bernard | 192/84.961 X |
| 3,082,933 | 3/1963 | Bernard | 192/84.961 X |
| 3,205,989 | 9/1965 | Mantey . | |
| 3,325,760 | 6/1967 | Bernard . | |
| 3,425,529 | 2/1969 | Hayashi | 192/84.961 X |
| 3,433,339 | 3/1969 | Martin et al. . | |
| 3,451,516 | 6/1969 | Watson . | |
| 4,413,717 | 11/1983 | Kanamaru et al. | 192/84.961 |
| 4,508,203 | 4/1985 | Packard et al. | 192/84.1 |
| 4,685,202 | 8/1987 | Booth et al. . | |
| 4,835,840 | 6/1989 | Stokes | 264/272.2 X |
| 4,891,077 | 1/1990 | Roll et al. . | |
| 4,891,619 | 1/1990 | Booth et al. . | |
| 5,036,964 | 8/1991 | Booth et al. | 192/84.961 X |
| 5,096,036 | 3/1992 | Booth et al. . | |
| 5,250,921 | 10/1993 | Van Laningham et al. . | |
| 5,361,883 | 11/1994 | Yamamoto . | |
| 5,445,259 | 8/1995 | Nelson | 192/84.1 X |

FOREIGN PATENT DOCUMENTS 196328  11/1983  Japan .

*Primary Examiner*—Rodney H. Bonck
*Attorney, Agent, or Firm*—MacMillan, Sobanski & Todd

[57] ABSTRACT

A component for use in an electromagnetic friction clutch, such as a rotor assembly, and a method of manufacturing same is disclosed. The rotor assembly includes an outer annular pulley which connected to a flat annular rotor plate for concurrent rotation. The pulley is located directly radially outwardly from the rotor plate such that radial loads imposed on the pulley are transmitted directly radially inwardly through the rotor plate to a support bearing, thereby reducing or eliminating undesirable cantilever stresses. The pulley and the rotor plate are preferably formed from a single piece of injection molded material which is not magnetically permeable, such as plastic. A plurality of relatively thin, concentric annular rings formed from a magnetically permeable material is carried on the rotor plate for rotation therewith. The rotor assembly further includes an inner tube which is generally hollow and cylindrical in shape and is preferably formed from a magnetically permeable material. The inner tube is concentric with the rotor plate and extends about the inner periphery thereof. A plurality of notches is formed in one end of the inner tube to facilitate the injection molding process. Similarly, the rotor assembly includes an outer tube which is generally hollow and cylindrical in shape and is preferably formed from a magnetically permeable material. The outer tube is concentric with the rotor plate and extends about the outer periphery thereof, just inside of the pulley. A plurality of notches is also formed in one end of the outer tube to facilitate the injection molding process.

26 Claims, 3 Drawing Sheets

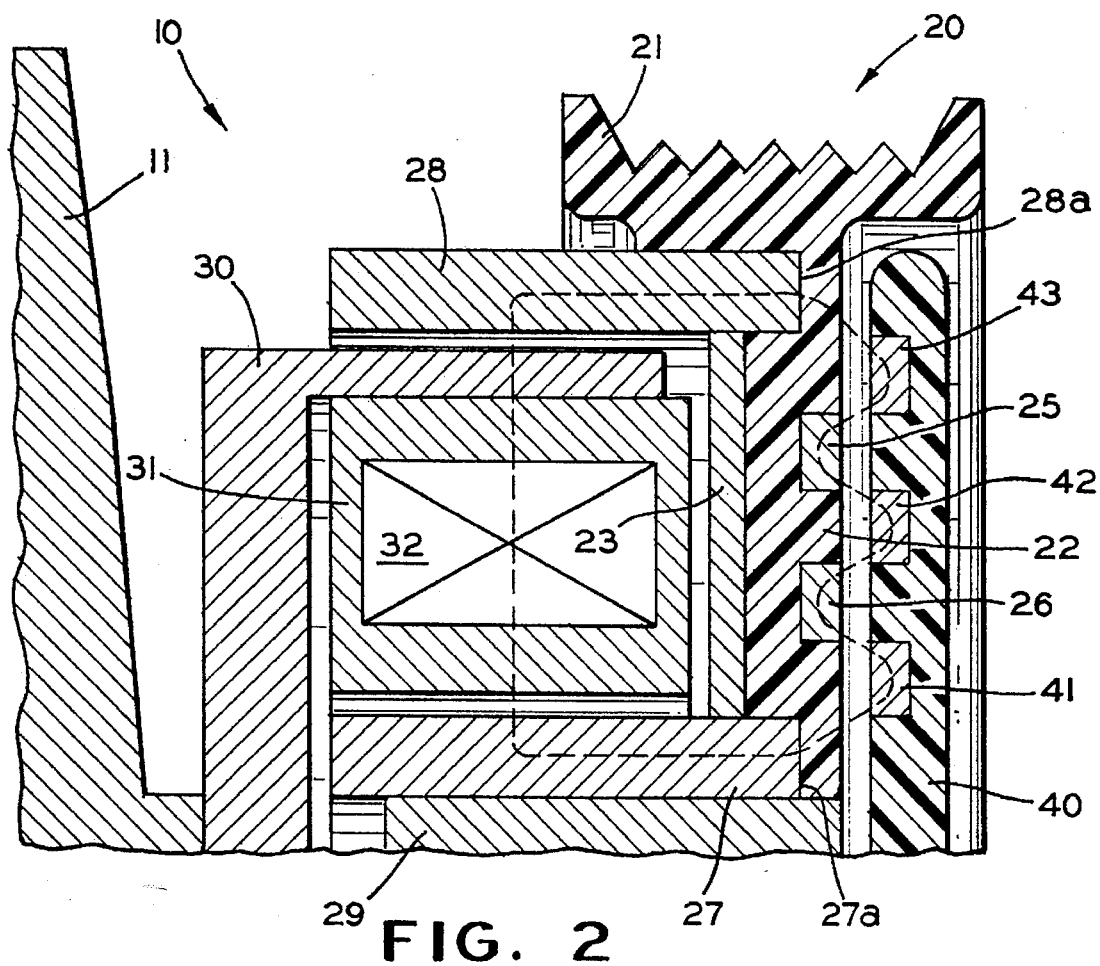
FIG. 2
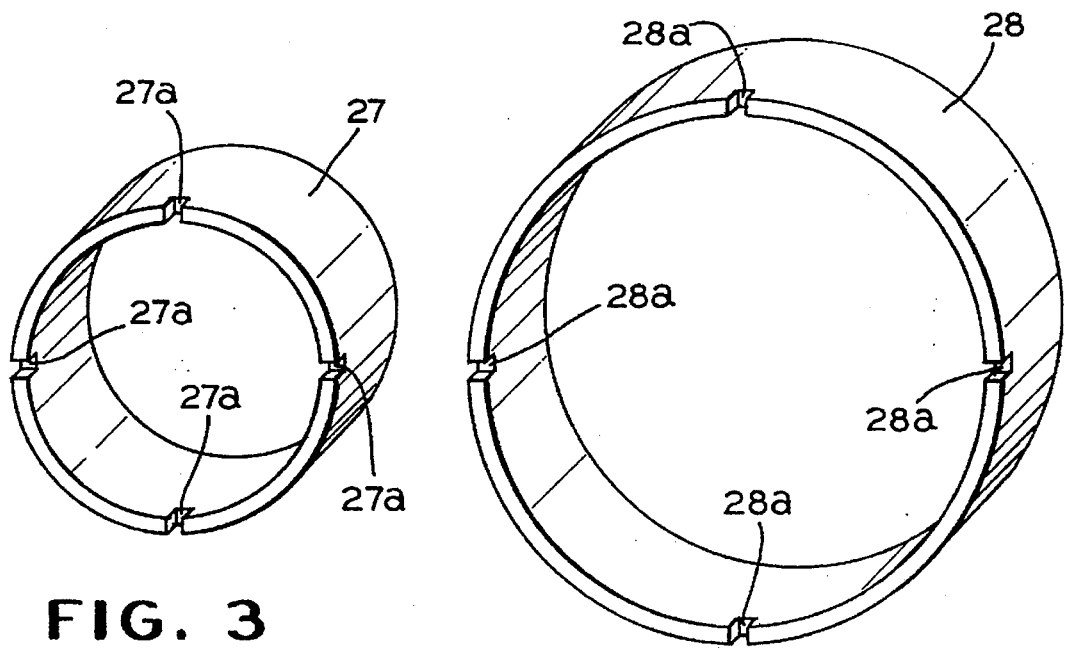
FIG. 3
FIG. 4

MOLDED PLASTIC ROTOR ASSEMBLY FOR ELECTROMAGNETIC FRICTION CLUTCH

BACKGROUND OF THE INVENTION

This invention relates in general to electromagnetic friction clutches and in particular to an improved structure for a rotor for such an electromagnetic friction clutch.

Clutches are well known devices which are commonly used in machinery to selectively connect a source of rotational power to a rotatably driven mechanism. A basic clutch structure includes an input member connected to the source of rotational power, an output member connected to the rotatably driven mechanism, and means for selectively connecting the input member to the output member for concurrent rotation. When the means for selectively connecting is engaged, the input member is connected to the output member so as to rotatably drive the mechanism. When the means for selectively connecting is disengaged, the input member is disconnected from the output member, and the mechanism is not rotatably driven. Many different types of clutches are known in the art for accomplishing this general purpose.

In some clutches, the means for selectively connecting includes a pair of members which are selectively moved into frictional engagement with one another to connect the input member to the output member. Such a friction clutch may include an input member which is fixed in a predetermined axial position and an armature which is constrained to rotate with the output member, but is free to move axially relative thereto between engaged and disengaged positions. In the engaged position, the armature frictionally engages the input member such that the output member is driven to rotate therewith. In the disengaged position, however, the armature is spaced apart from the input member and, therefore, provides no rotational driving connection therewith. Often, the armature is normally maintained in the disengaged position by a resilient spring so as not to frictionally engage the input member unless affirmatively moved into the engaged position by an actuator. Friction clutches of this general type are well known in the art.

In some friction clutches, an electromagnet is used to cause movement of the armature between the engaged and disengaged positions. Electromagnetically actuated friction clutches operate on the principle that a magnetic field which is created about a component formed from a magnetically permeable material will exert a mechanical force on that component. This mechanical force will urge the component to move to a position of minimum resistance relative to the flow of magnetic flux (lines of force) generated by the magnetic field, usually referred to as a position of minimum reluctance. Thus, in electromagnetically actuated friction clutches, the armature and the input member are usually both formed from a magnetically permeable material. When the electromagnet is energized, the electromagnetic field generated thereby attracts the armature toward the input member. As a result, the armature is moved from the disengaged position to the engaged position to connect the input member to the output member and, thus, cause the driven device to be rotatably driven by the source of rotational power.

The input member of a typical electromagnetically actuated friction clutch is embodied as an annular pole piece having a generally U-shaped cross section defined by a radially extending pole face extending between concentric inner and outer tubes. The pole face is normally axially separated from the armature by a relative small air gap. Because they are both formed from a magnetically permeable material, the armature will be attracted to move axially toward the pole face when the electromagnet is energized. To increase the magnitude of this magnetic attraction, and thereby increase the torque transmitting capability of the clutch as a whole, the armature and the pole face are frequently divided into one or more pole regions by a non-magnetically permeable material. These separate pole regions cause the magnetic flux generated by the electromagnet to jump back and forth several times across the air gap separating the armature and the pole face when the electromagnet is energized. For reasons which are well known in the art, this magnetic flux discontinuity structure, or more simply flux break, is effective to increase the magnitude of the magnetic attraction between the armature and the pole piece when the electromagnet is energized.

In the past, both the armature and the pole piece have been formed from a magnetically permeable material, and the flux breaks have been provided by forming slots or recesses in both the armature and the pole piece. These slots or recesses define relatively large air gaps between adjacent pole regions of the magnetically permeable material. Although effective to increase the magnetic attraction between the armature and the pole piece, the formation of such slots or recesses in pole face necessitates the removal of material from the armature or the pole piece, which has been found to weaken the overall strength thereof. Because electromagnetically actuated friction clutches of this type are often used to selectively transmit relatively high torque loads, any weaknesses in the armature or the pole piece undesirably diminish the torque transmitting capacity of the clutch as a whole. Furthermore, because electromagnetically actuated clutches of this type are often used in automotive applications, such as in air conditioner compressor assemblies, they must be relatively simple and inexpensive in construction. Accordingly, it would be desirable to provide an improved component for use in an electromagnetically actuated clutch having one or more flux breaks, such as an armature or a pole piece, and a method for manufacturing same, which addresses these concerns.

SUMMARY OF THE INVENTION

This invention relates to an improved structure for a component for use in an electromagnetic friction clutch, such as a rotor assembly, and a method of manufacturing same. The rotor assembly includes an outer annular pulley which connected to a flat annular rotor plate for concurrent rotation. The pulley is located directly radially outwardly from the rotor plate such that radial loads imposed on the pulley are transmitted directly radially inwardly through the rotor plate to a support bearing, thereby reducing or eliminating undesirable cantilever stresses. The pulley and the rotor plate are preferably formed from a single piece of injection molded material which is not magnetically permeable, such as plastic. A plurality of relatively thin, concentric annular rings formed from a magnetically permeable material are carried on the rotor plate for rotation therewith. The rotor assembly further includes an inner tube which is generally hollow and cylindrical in shape and is preferably formed from a magnetically permeable material. The inner tube is concentric with the rotor plate and extends about the inner periphery thereof. A plurality of notches is formed in one end of the inner tube to facilitate the injection molding process. Similarly, the rotor assembly includes an outer tube which is generally hollow and cylindrical in shape and is preferably formed from a magnetically permeable material. The outer tube is concentric with the rotor plate and extends about the outer periphery thereof, just inside of the pulley. A plurality of notches is also formed in one end of the outer tube to facilitate the injection molding process.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is an enlarged sectional elevational view of portions of the electromagnetic friction clutch and rotor assembly illustrated in FIG. 1.

FIG. 3 is an enlarged perspective view of the inner tube of the rotor assembly illustrated in FIGS. 1 and 2.

FIG. 4 is an enlarged perspective view of the outer tube of the rotor assembly illustrated in FIGS. 1 and 2.

DETAILED DESCRIPTION OF THE PREFERRED EMBODIMENT

Figure 1:
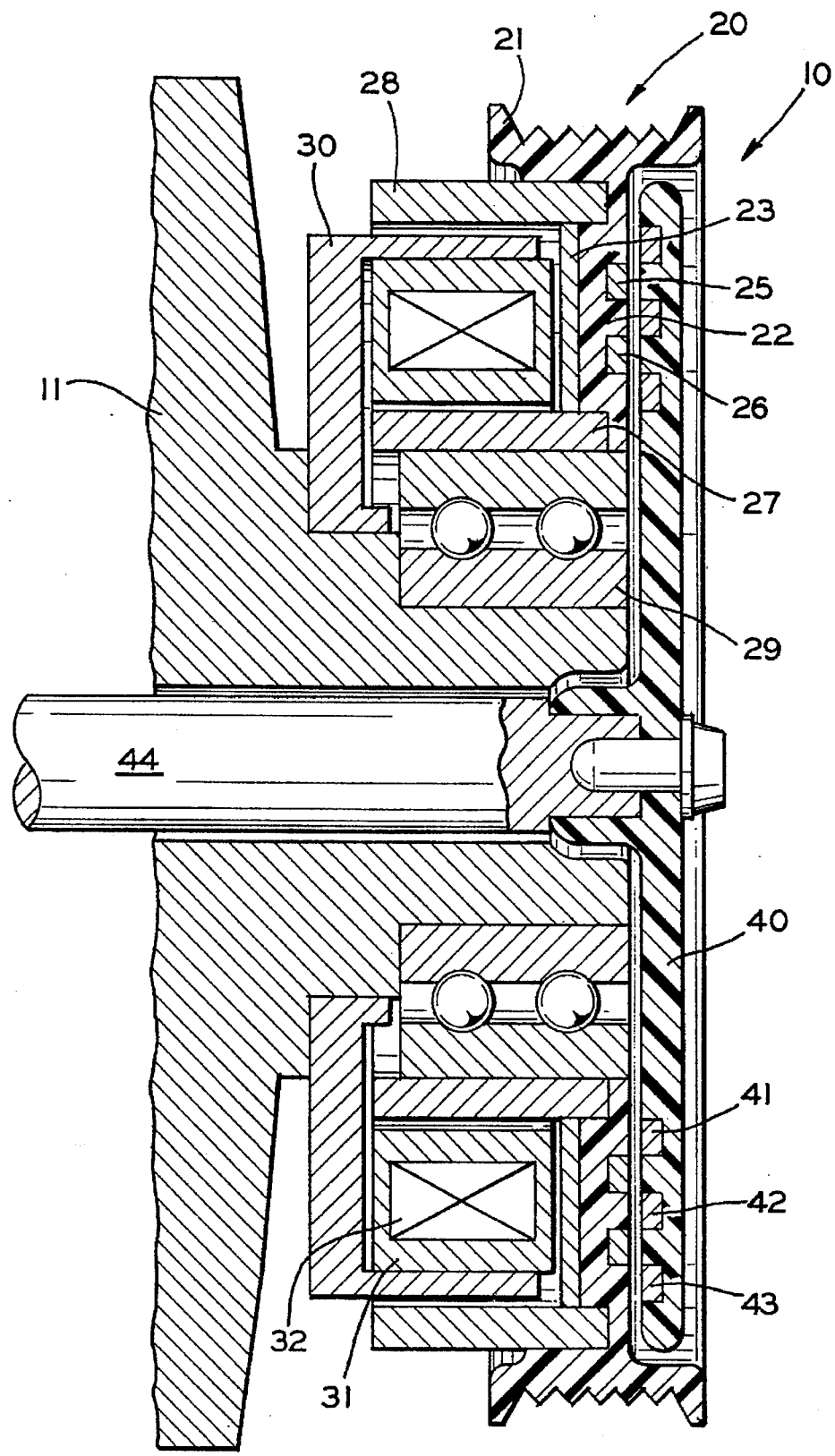
FIG. 1 is a sectional elevational view of an electromagnetic friction clutch including a rotor assembly formed in accordance with this invention.

Referring now to the drawings, there is illustrated in FIG. 1 an electromagnetic friction clutch, indicated generally at 10, in accordance with this invention. The electromagnetic friction clutch 10 is adapted to selectively connect a source of rotational energy with a rotatably driven device. For example, the source of rotational energy may be a vehicle engine (not shown), and the driven device may be a conventional vehicle air conditioning compressor, a portion of which is illustrated at 11. As will be explained in detail below, when the electromagnetic friction clutch 10 is engaged, the engine of the vehicle is connected therethrough to operate the air conditioning compressor 11. When the electromagnetic friction clutch 10 is disengaged, however, the engine of the vehicle is disconnected from the air conditioning compressor 11, and the air conditioning compressor 11 is not operated. Although described and illustrated in the context of an air conditioning compressor 11, it will nonetheless be appreciated that the electromagnetic friction clutch 10 of this invention may be used in other applications.

As best shown in FIGS. 1 and 2, the electromagnetic friction clutch 10 includes a generally annular rotor assembly, indicated generally at 20, which is rotatably driven by the source of rotational energy. To facilitate connection to the source of rotational energy, the rotor assembly 20 includes an outer annular pulley 21. The pulley 21 can be connected to the source of rotational energy for rotation by any conventional means, such as by an endless belt (not shown) which is looped therabout. The pulley 21 is connected to a flat annular rotor plate 22 for concurrent rotation. Preferably, the pulley 21 is located directly radially outwardly from the rotor plate 22, as shown in FIGS. 1 and 2. The purpose for this radial orientation will be explained below.

As will also be described in detail below, the pulley 21 and the rotor plate 22 of the rotor assembly 20 are preferably formed from a single piece of material which is not magnetically permeable. If desired, a flat annular backing plate 23 or similar reinforcing structure may be secured to one face of the rotor plate 22. The backing plate 23 is also preferably formed from a non-magnetically permeable material and provides mechanical support for the rotor plate 22. A plurality of relatively thin, concentric annular rings are carried on the rotor plate 22 for rotation therewith. In the illustrated embodiment, two annular rings 25 and 26 are carried on the rotor plate 22, although a different number of such rings may be provided if desired. The annular rings 25 and 26 are preferably formed from a magnetically permeable material. The purpose for these rings 25 and 26 will be explained below.

The rotor assembly 20 further includes an inner tube 27 which is generally hollow and cylindrical in shape and is preferably formed from a magnetically permeable material. The inner tube 27 is concentric with the rotor plate 22 and extends about the inner periphery thereof. A plurality of notches 27a is formed in one end of the inner tube 27 for a purpose which will be explained below. Similarly, the rotor assembly includes an outer tube 28 which is generally hollow and cylindrical in shape and is preferably formed from a magnetically permeable material. The outer tube 28 is concentric with the rotor plate 22 and extends about the outer periphery thereof, just inside of the pulley 21. A plurality of notches 28a is formed in one end of the outer tube 28 for a purpose which will also be explained below. In the illustrated embodiment, four notches 27a and 28a are formed in the ends of the inner and outer tubes 27 and 28, respectively, and are equidistantly spaced thereabout. Also, the illustrated notches 27a and 28a are radially aligned. However, the inner and outer tubes 27 and 28 may be formed having notches 27a and 28a of differing numbers and spacing if desired.

The entire rotor assembly 20 thus far described is supported on the housing of the air conditioning compressor 11 for rotation. In the illustrated embodiment, a conventional annular bearing 29 is provided for rotatably supporting the rotor assembly 20 on the housing of the air conditioning compressor 11 for rotation. However, the rotor assembly 20 may be rotatably supported on the housing of the air conditioning compressor 11 by any other conventional means.

An annular cup-shaped support member 30 is mounted on the housing of the air conditioning compressor 11 in a non-rotatable manner. The support member 30 is preferably formed from a material which is not magnetically permeable. A hollow annular electromagnetic coil housing 31 is secured to one end of the support member 30, and an electromagnetic coil 32 is disposed within the coil housing 31. The coil housing 31 and the coil 32 are both conventional in the art. The coil housing 31 is preferably formed from a material which is not magnetically permeable. The coil 32 can be formed from a number of windings of an electrical conductor, such as a metal wire, which is selectively connected to a source of electrical energy (not shown). In a manner which is well known in the art, the coil 32 is connected to the source of electrical energy so as to cause an electrical current to flow therethrough. When this occurs, the coil 32 generates a magnetic field, which results in the flow of magnetic flux in a magnetic circuit which will be described below.

The electromagnetic friction clutch 10 further includes a generally flat annular armature plate 40. The armature plate 40 is disposed adjacent to the rotor plate 22 and extends generally parallel thereto. Any conventional means, such as a leaf spring (not shown) may be used to urge the armature plate 40 axially away from the rotor plate 22 so as to normally maintain an axial gap therebetween. The armature plate 40 is preferably formed from a material which is not magnetically permeable. A plurality of relatively thin, concentric annular rings are carried on the rotor plate 22 for rotation therewith. In the illustrated embodiment, three annular rings 41, 42, and 43 are carried on the armature plate 40. The rings 41, 42, and 43 are positioned on the armature 40 so as to be radially offset from the annular rings 25 and 26 carried on the rotor plate 22. However, a different number of such rings 41, 42, and 43 having different spacing may be provided if desired. The annular rings 41, 42, and 43 are preferably formed from a magnetically permeable material. The purpose for these rings 41, 42, and 43 will be explained below. The armature plate 40 is secured to an output shaft 44 for rotation therewith. In the illustrated embodiment, the output shaft 44 extends co-axially through the electromagnetic friction clutch 10 and the air conditioner compressor 11.

In operation, the rotor assembly 20 is rotatably driven by the engine of the vehicle. As mentioned above, the armature plate 40 is normally axially spaced apart from the rotor plate 22. In this disengaged position, the armature plate 40 is not rotatably driven by the rotor plate 22. However, when the electromagnetic coil 32 is energized as described above, magnetic flux flows in the path indicated by the dotted line in FIG. 2 to create a magnetic circuit. This magnetic circuit jumps back and forth between the annular rings 25 and 26 carried on the rotor plate 22 and the annular rings 41, 42, and 43 carried on the armature plate 40. As a result, the armature plate 40 is magnetically attracted axially toward the rotor plate 22. Consequently, the armature plate 40 is moved from the illustrated disengaged position to an engaged position, wherein it frictionally engages the rotor plate 22. Thus, the rotor plate 22 carrying the rings 25 and 26 functions as a pole piece for the electromagnetic friction clutch 10. In this manner, the output shaft 44 is caused to be rotatably driven by the rotor plate 22 to operate the air conditioning compressor 11.

As discussed above, the pulley 21 is positioned directly radially outwardly from the rotor plate 22. This structure is desirable because the pulley 21 is connected to the source of rotational energy for rotation by an endless belt which is looped thereabout. As is known in the art, such an endless belt generates a radially directed load on the pulley 21. In the illustrated rotor assembly 20, this radial load is transferred directly radially inwardly through the rotor plate 22 to the bearing 29 and the housing of the air conditioner compressor 11. As a result, virtually no undesirable cantilever forces are generated within any of the mechanical components of the electromagnetic friction clutch 10.

Figure 5:
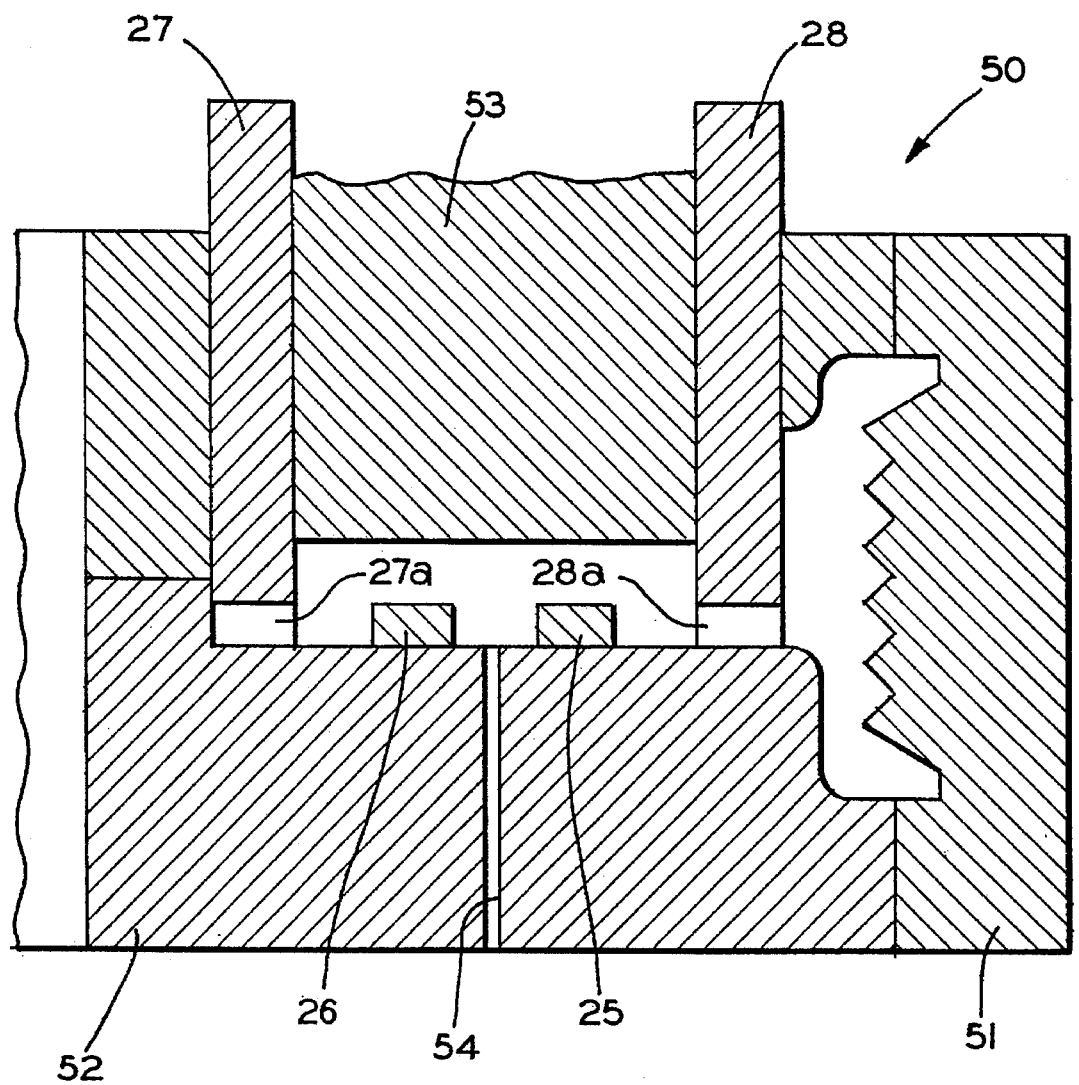
FIG. 5 is an enlarged sectional elevational view schematically illustrating an apparatus for plastic injection molding the rotor assembly illustrated in FIGS. 1 and 2 in accordance with this invention.

Referring now to FIG. 5, there is illustrated an apparatus, indicated generally at 50, for manufacturing the rotor assembly 20 illustrated in FIGS. 1 and 2 in accordance with this invention. The illustrated apparatus 50 is a plastic injection molding apparatus which includes a plurality of die sections 51, 52, and 53. The die sections 51, 52, and 53 cooperate to define a mold cavity having the same general shape as the pulley 21 and the rotor plate 22 of the rotor assembly 20. To form this component, the annular rings 25 and 26 are initially disposed within the mold cavity at locations which correspond to the relative locations illustrated in FIGS. 1 and 2. The inner and outer tubes 27 and 28 are also disposed within the mold cavity as shown. The die section 53 is then moved downwardly into the annular space defined between the inner and outer tubes 27 and 28. The end of the die section 53 is maintained spaced apart from the die section 52 by a predetermined distance which is equal to the axial thickness of the rotor plate 22.

Then, molten plastic or a similar fluid material is injected through a passageway 54 formed through the die section 52 and into the mold cavity. The molten plastic flows about the annular rings 25 and 26 such that the rings 25 and 26 are molded into and retained in the rotor plate 22. The molten plastic also flows into the notches 27a formed in the inner tube 27 such that the inner tube 27 is molded to and retained with the inner peripheral edge of the rotor plate 22. Lastly, the molten plastic flows through the notches 28a formed in the outer tube 28 such that the outer tube 28 is molded to and retained with the outer peripheral edge of the rotor plate 22 and to form the pulley 21. It will be appreciated that the notches 27a and 28a permit the entire rotor assembly 20 to be formed using a single shot of molten plastic. This simplifies the molding method and reduces the cost of manufacture.

As discussed above, the rings 22 and 23 carried on the rotor plate 21, the tubes 25 and 26, the support member 30, and the rings 41, 42, and 43 carried on the armature 40 are all preferably formed from a magnetically permeable material. Generally speaking, a magnetically permeable material is a material which does not significantly resist the flow of magnetic flux therethrough. The magnetically permeable material may be embodied from steel, iron, cobalt, nickel, and alloys thereof. Preferably, the magnetically permeable material is embodied from AISI 1010 steel. Similarly, a material which is not magnetically permeable is a material which does significantly resist the flow of magnetic flux therethrough. One type of plastic material which has been found to be suitable for forming the rotor assembly 20 is DuPont Zytel ST 801-HS. Another suitable plastic armature is disclosed in U.S. Pat. No. 5,036,964 to Booth et al.

In accordance with the provisions of the patent statutes, the principle and mode of operation of this invention have been explained and illustrated in its preferred embodiment. However, it will be understood that this invention may be practiced otherwise than as specifically explained and illustrated without departing from its spirit or scope.

What is claimed is:

1. A rotor assembly for an electromagnetic clutch comprising:
   an inner tube formed from a magnetically permeable material;
   an outer tube formed from a magnetically permeable material and disposed about said inner tube;
   a rotor plate formed from a material which is not magnetically permeable and extending between said inner and outer tubes, said rotor plate having a pulley formed integrally therewith which is located directly radially outwardly from said rotor plate; and
   a generally annular ting formed from a magnetically permeable material and carried on said rotor plate.

2. The rotor assembly defined in claim 1 wherein one of said inner tube and said outer tube has a notch formed therein, and a portion of said rotor plate extends into said notch.

3. The rotor assembly defined in claim 1 wherein one of said inner tube and said outer tube has a plurality of notches formed therein, and portions of said rotor plate extend into said notches.

4. The rotor assembly defined in claim 1 wherein each of said inner tube and said outer tube has a notch formed therein, and portions of said rotor plate extend into said notches.

5. The rotor assembly defined in claim 1 wherein each of said inner tube and said outer tube has a plurality of notches formed therein, and portions of said rotor plate extend into said notches.

6. The rotor assembly defined in claim 1 wherein a plurality of generally annular rings formed from a magnetically permeable material are carried on said rotor plate.

7. A rotor assembly for an electromagnetic clutch comprising:
   an inner tube formed from a magnetically permeable material;
   an outer tube formed from a magnetically permeable material and disposed about said inner tube, one of said inner and outer tubes having a notch formed therein;
   a rotor plate adapted to be frictionally engaged by an armature of the electromagnetic clutch during use, said rotor plate being formed from a material which is not magnetically permeable and extending between said inner and outer tubes to retain said inner and outer tubes together, a portion of said rotor plate extending into said notch; and
   a generally annular ring formed from a magnetically permeable material and carried on said rotor plate.

8. The rotor assembly defined in claim 7 wherein said one of said inner tube and said outer tube has a plurality of notches formed therein, and portions of said rotor plate extend into said notches.

9. The rotor assembly defined in claim 7 wherein each of said inner tube and said outer tube has a notch formed therein, and portions of said rotor plate extend into said notches.

10. The rotor assembly defined in claim 7 wherein each of said inner tube and said outer tube has a plurality of notches formed therein, and portions of said rotor plate extend into said notches.

11. The rotor assembly defined in claim 7 wherein a plurality of generally annular rings formed from a magnetically permeable material are carried on said rotor plate.

12. The rotor assembly defined in claim 7 further including a pulley which is connected to and located directly radially outwardly from said rotor plate.

13. The rotor assembly defined in claim 12 wherein said pulley is formed integrally with said rotor plate.

14. An electromagnetic friction clutch for selectively connecting a source of rotational energy to a driven device comprising:
   a rotor assembly adapted to be rotatably driven by the source of rotational energy, said rotor assembly including an inner tube formed from a magnetically permeable material, an outer tube formed from a magnetically permeable material and disposed about said inner tube, a rotor plate formed from a material which is not magnetically permeable and extending between said inner and outer tubes, said rotor plate having a pulley formed integrally therewith which is located directly radially outwardly from said rotor plate, and a generally annular ring formed from a magnetically permeable material and carded on said rotor plate;
   an armature adapted to be connected to the driven device, said armature being disposed adjacent to said rotor plate and including a portion which is formed from a magnetically permeable material, said armature being movable between an engaged position, wherein said armature frictionally engages said rotor plate, and a disengaged position, wherein said armature does not frictionally engage said rotor plate; and
   an electromagnetic coil for selectively creating a magnetic field to move said armature from said disengaged position to said engaged position.

15. The rotor assembly defined in claim 14 wherein one of said inner tube and said outer tube has a notch formed therein, and a portion of said rotor plate extends into said notch.

16. The rotor assembly defined in claim 14 wherein one of said inner tube and said outer tube has a plurality of notches formed therein, and portions of said rotor plate extend into said notches.

17. The rotor assembly defined in claim 14 wherein each of said inner tube and said outer tube has a notch formed therein, and portions of said rotor plate extend into said notches.

18. The rotor assembly defined in claim 14 wherein each of said inner tube and said outer tube has a plurality of notches formed therein, and portions of said rotor plate extend into said notches.

19. The rotor assembly defined in claim 14 wherein a plurality of generally annular rings formed from a magnetically permeable material are carried on said rotor plate.

20. An electromagnetic friction clutch for selectively connecting a source of rotational energy to a driven device comprising:
   a rotor assembly adapted to be rotatably driven by the source of rotational energy, said rotor assembly including an inner tube formed from a magnetically permeable material, an outer tube formed from a magnetically permeable material and disposed about said inner tube, one of said inner and outer tubes having a notch formed therein, a rotor plate adapted to be frictionally engaged by an armature of the electromagnetic clutch during use, said rotor plate being formed from a material which is not magnetically permeable and extending between said inner and outer tubes to retain said inner and outer tubes together, a portion of said rotor plate extending into said notch, and a generally annular ring formed from a magnetically permeable material and carried on said rotor plate
   an armature adapted to be connected to the driven device, said armature being disposed adjacent to said rotor plate and including a portion which is formed from a magnetically permeable material, said armature being movable between an engaged position, wherein said armature frictionally engages said rotor plate, and a disengaged position, wherein said armature does not frictionally engage said rotor plate; and
   an electromagnetic coil for selectively creating a magnetic field to move said armature from said disengaged position to said engaged position.

21. The rotor assembly defined in claim 20 wherein said one of said inner tube and said outer tube has a plurality of notches formed therein, and portions of said rotor plate extend into said notches.

22. The rotor assembly defined in claim 20 wherein each of said inner tube and said outer tube has a notch formed therein, and portions of said rotor plate extend into said notches.

23. The rotor assembly defined in claim 20 wherein each of said inner tube and said outer tube has a plurality of notches formed therein, and portions of said rotor plate extend into said notches.

24. The rotor assembly defined in claim 20 wherein a plurality of generally annular rings formed from a magnetically permeable material are carried on said rotor plate.

25. The rotor assembly defined in claim 20 further including a pulley which is connected to and located directly radially outwardly from said rotor plate.

26. The rotor assembly defined in claim 25 wherein said pulley is formed integrally with said rotor plate.

* * * * *